UNITED STATES PATENT OFFICE.

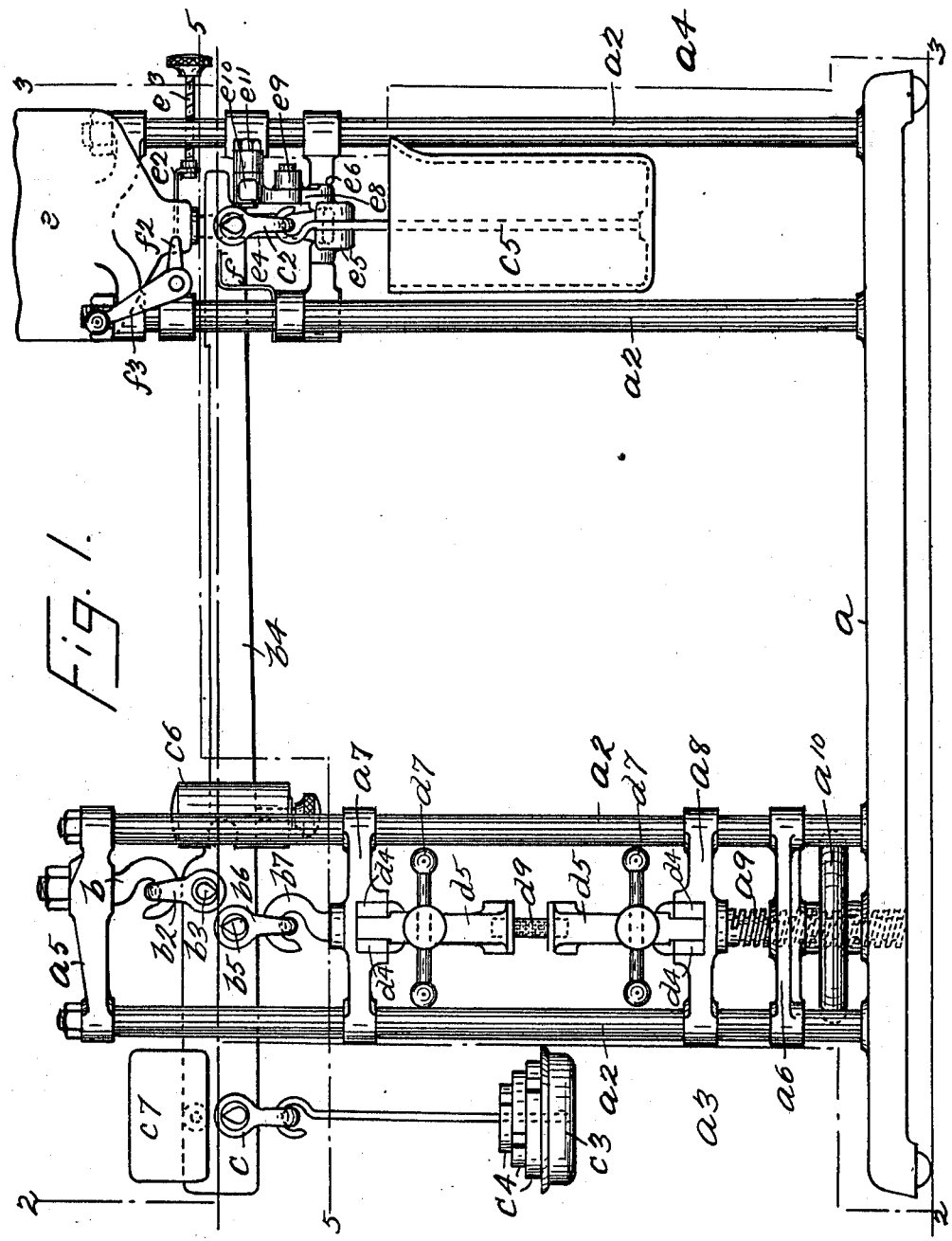

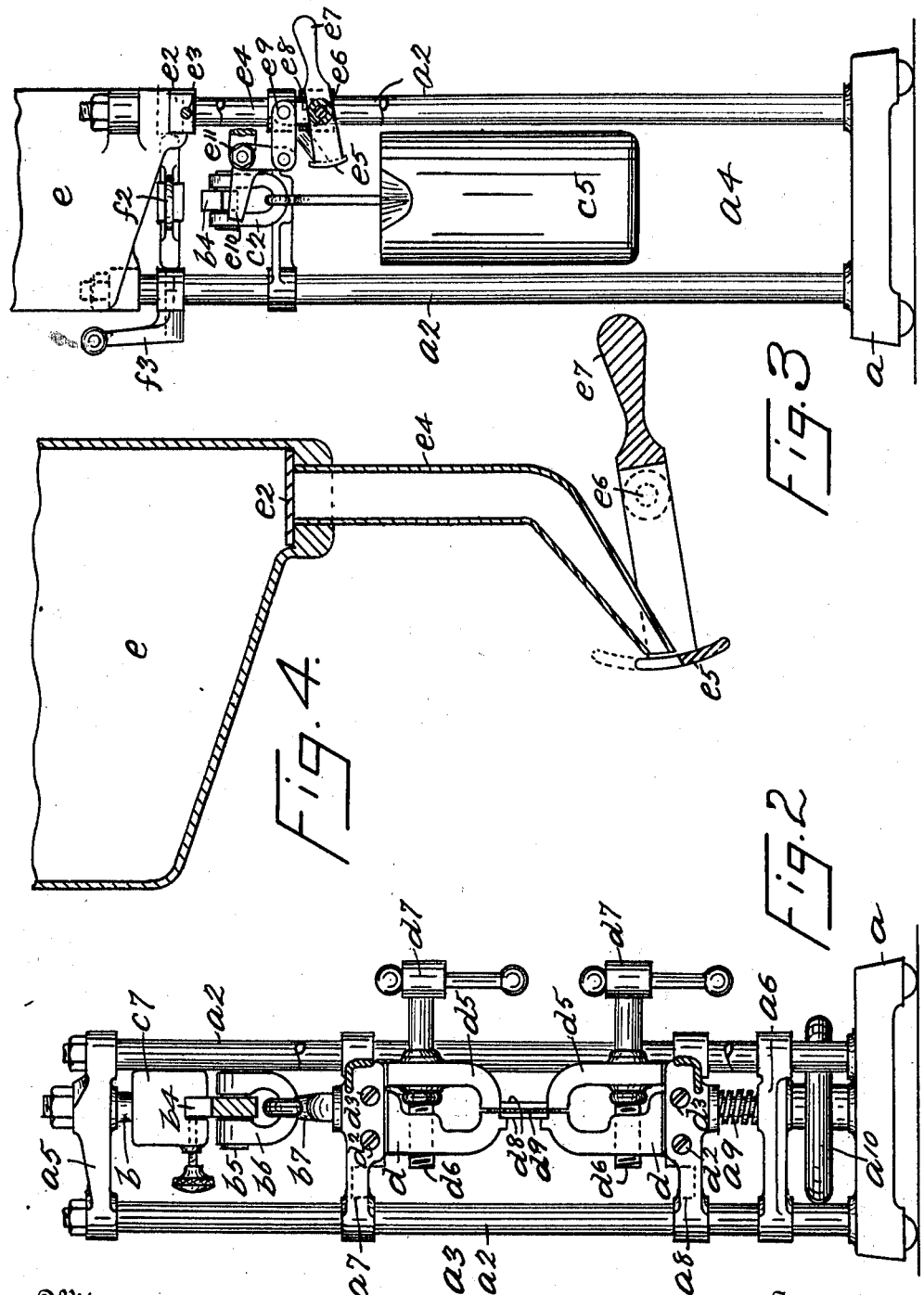

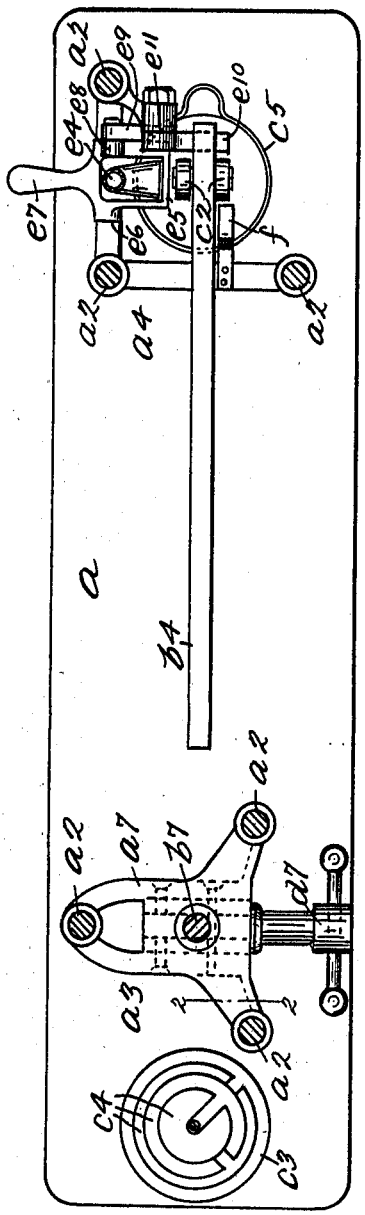

SAMUEL H. McKNIGHT, OF BROOKLYN, NEW YORK.

TESTING-MACHINE.

993,700. Specification of Letters Patent. Patented May 30, 1911.

Application filed July 21, 1910. Serial No. 572,968.

*To all whom it may concern:*

Be it known that I, SAMUEL H. MC-KNIGHT, a citizen of the United States of America, and residing at Brooklyn, in the county of Kings and State of New York, have invented certain new and useful Improvements in Testing-Machines, of which the following is a specification, such as will enable those skilled in the art to which it appertains to make and use the same.

This invention relates to the testing of textiles, and the object thereof is to provide a machine for testing the tensile strength of such materials, as well as of the threads, yarns, or the like forming the same.

A further object is to accomplish this result by means of balancing weights.

A further object is to provide means for employing such weights in minute degrees whereby a more exact reading is assured.

A further object is to provide automatic means for feeding such weights.

A further object is to provide means for closing off the said feeding of weights automatically when the breaking point of the material being tested has been reached.

A further object is to provide a steelyard in such a machine and also means for manually maintaining an exact balance thereof during the feeding of the said weights; and a further object is to provide such a machine which is simple in construction and use, which is positive in action, and which is comparatively inexpensive.

My invention is fully described in the following specification, of which the accompanying drawings form a part, in which the separate parts are designated by the same reference characters in each of the views, and in which:—

Figure 1 is a side elevation of my invention in use; Fig. 2 is a section thereof taken on the line 2—2 of Fig. 1; Fig. 3 is a section thereof taken on the line 3—3 of Fig. 1; Fig. 4 is an enlarged section of a detail which I use; Fig. 5 is a section taken on the line 5—5 of Fig. 1; Fig. 6 is a fragmentary, sectional, view on the line 6—6 of Fig. 7; and Fig. 7 is a similar view on the line 7—7 of Fig. 6.

In the drawings forming a part of this application I have shown a base $a$ having a plurality of vertical posts $a^2$ arranged, in the form shown, in sets of three, as shown at $a^3$ and $a^4$, those at $a^3$ being joined by fixed cross-heads $a^5$ and $a^6$ and having sliding cross-heads $a^7$ and $a^8$ thereon, the lower of which is provided with a screw $a^9$ engaging a wheel $a^{10}$ whereby the said cross-head $a^8$ may be vertically adjusted.

Secured in the fixed cross-head $a^5$ is a hook $b$ engaged by support $b^2$ for a fulcrum $b^3$ of a steelyard $b^4$ having also an opposing fulcrum $b^5$ engaged by a hanger $b^6$ in turn engaged with a hook $b^7$ secured to the cross-head $a^7$, and the said steelyard is also provided with similar hangers $c$ and $c^2$ at the opposite ends thereof, the former supporting a weight support $c^3$ adapted to hold weights $c^4$ of the usual form, and the latter supporting a bucket $c^5$ for reasons hereinafter described, and, if desired, a sliding counterpoise $c^6$ may also be employed and the steelyard graduated in the usual manner, and also with one $c^7$ for adjusting the normal balance of the steelyard.

Secured in each of the sliding cross-heads $a^7$ and $a^8$ is one jaw $d$ of a vise, held by means of screws $d^2$ and $d^3$, the latter of which passes entirely across and through forked members $d^4$ of the said jaw $d$ and between which is slidably mounted the complemental jaw $d^5$ carrying the adjusting screw $d^6$ having the usual or any desired actuating handle $d^7$ and, in practice, the said vises are each adapted to engage the ends of a measured portion of the material to be tested, a templet $d^8$ being employed upon each side of the material, said material shown therebetween at $d^9$, to insure a predetermined length of the material, as also to insure the perfect flattening of the material to avoid creases, wrinkles, and the like, said templets being held between the clutching devices by friction and being free to fall upon the stretching of the material being tested, thus not interfering in any way with the testing.

Secured upon the posts $a^2$ in the group $a^4$ is a tank $e$ adapted to hold shot or the like and provided with a slide $e^2$ at the bottom thereof controlled by a screw $e^3$ to limit the feed of shot to a tube $e^4$ leading to a point above the bucket $c^5$, the end of the said tube being controlled by a gate $e^5$ pivoted at $e^6$ and controlled by a handle $e^7$ as well as by a train of links $e^8$ and $e^9$ pivoted to a bell crank lever $e^{10}$ pivoted at $e^{11}$ and extending beneath the outer end of the steelyard, and whereby, when the said steelyard arm or end descends, the crank lever is actuated, as is also the gate $e^5$ into the position shown in dotted lines in Fig. 4, thus closing the end of the tube $e^4$ and closing off the feed of the shot weights, a fine degree of said shot being employed, but not being shown in the drawings as the form thereof is well known.

Closely adjacent the outer end of the steelyard is an index $f$ pointing to the normal or balanced position of the said steelyard, and arranged above the said steelyard end is a leaf $f^2$ controlled by a lever $f^3$ to lock the said steelyard in the usual manner.

In the use of my testing machine, the material is placed within the vises as previously set forth and the hand-wheel $a^{10}$ actuated, manually, to bring the steelyard to exact balanced position, it being understood that the weights $c^4$, exactly counterbalance the bucket $c^5$ previous to the opening of the slide valve $e^2$ of the shot tank $e$, the weight $c^7$ being for initial truing of the steelyard after which the said slide is opened and the shot passes through the tube $e^4$ and, the gate $e^5$ being in its lowermost position, into the bucket, this increasing weight of the bucket being equalized by the corresponding rotation of the hand wheel $a^{10}$ whereby the steelyard is maintained in its balanced position until the material being tested breaks, whereon the outer end of the steelyard drops and, striking the lever $c^{10}$, actuates the gate $e^5$ to close the end of the tube $e^4$, after which the bucket may be removed, placed in the position of the weights $c^4$ and support $c^3$ thereof, and weighed by means of the counterbalance $c^6$ in the ordinary manner of scales of this class and, the weight of the bucket itself being originally equalized by the weights $c^4$, the weight of the shot is readily seen, thus giving the tensile strength of the said material.

While I have described shot as the medium for producing the desired result it will be evident that other mediums may be employed, and my device may also be used for testing materials other than textiles, and various changes in and modifications of the details of construction shown and described may be made to accommodate the device to specific uses within the scope of the following claims.

Having fully described my invention, what I claim as new and desire to secure by Letters Patent, is:—

1. A textile testing device, comprising upright rods, a steelyard supported by said rods, a traveler on said rods, in connection with said steelyard, a textile clutching device on said traveler, a supplemental traveler on said rods provided also with a textile clutching device, means for moving said last named traveler to cause tension on the textile held in said clutching devices, a bucket at the outer end of said steelyard, means for increasing the weight of said bucket, means controlled by said steelyard for stopping said increase in weight of said bucket at the moment of breaking, and a slide for controlling the start and degree of said increase.

2. A textile testing machine, comprising movable clutching devices and means for determining the textile breaking point; a templet of predetermined length arranged on each side of the textile and extending from one clutching device to the other previous to causing tension on said textile, said templets accurately determining the length of the textile to be tested, and insuring the same against wrinkles or creases previous to said test, said templets being released in the separation of said clutching devices during the test of said textile.

In testimony that I claim the foregoing as my invention I have signed my name in presence of the subscribing witnesses this 16th day of July 1910.

SAMUEL H. McKNIGHT.

Witnesses:
GEORGE F. BENTLEY,
J. C. LARSEN.

---

Copies of this patent may be obtained for five cents each, by addressing the "Commissioner of Patents, Washington, D. C."